J. C. HOFER.

Process of Gilding Moldings, &c.

No. 8,797. Reissued July 8, 1879.

Attest.
J. W. Layman.
E. M. Bohl

Inventor.
Jacob C. Hofer
by James N. Layman
his Attorney.

UNITED STATES PATENT OFFICE.

JACOB C. HOFER, OF CINCINNATI, OHIO.

IMPROVEMENT IN PROCESSES OF GILDING MOLDINGS, &c.

Specification forming part of Letters Patent No. 215,222, dated May 13, 1879; Reissue No. 8,797, dated July 8, 1879; application filed June 9, 1879.

*To all whom it may concern:*

Be it known that I, JACOB C. HOFER, of Cincinnati, Hamilton county, Ohio, have invented a new and useful Process of Gilding Moldings, &c., of which process the following is a specification.

The object of my invention is to gild moldings in a much more rapid and economical manner than has heretofore been done.

According to the old process, the molding or other piece of stuff is first covered on its face with whiting and then with a coat of gold-size, after which act this size is moistened with alcohol, so as to cause the silver-leaf to adhere thereto. The silver-leaf must then be burnishd down perfectly smooth to receive the final coat of gold-varnish, which varnish imparts to the molding the desired gilt color. The principal objection to this process is the cost of the silver-leaf and the time consumed in applying it to the molding, as none but an experienced silver-layer can spread the leaf smoothly.

To overcome these serious objections I proceed as follows: I employ the customary whitened molding, and give it one or more coats of gold-size, such as used by gilders preparatory to burnishing. This gold-size is then covered with a thin wash of ordinary starch-size, and while the latter is yet damp the bronze is spread on with a soft brush and then rubbed down with cotton. The molding is now allowed to dry, and the bronze is wholly or partially burnished, according to the style of finish. Finally, the burnished molding may be coated with any suitable transparent varnish, for the purpose of preserving the bright gilt color that renders the article salable.

Figure 1:
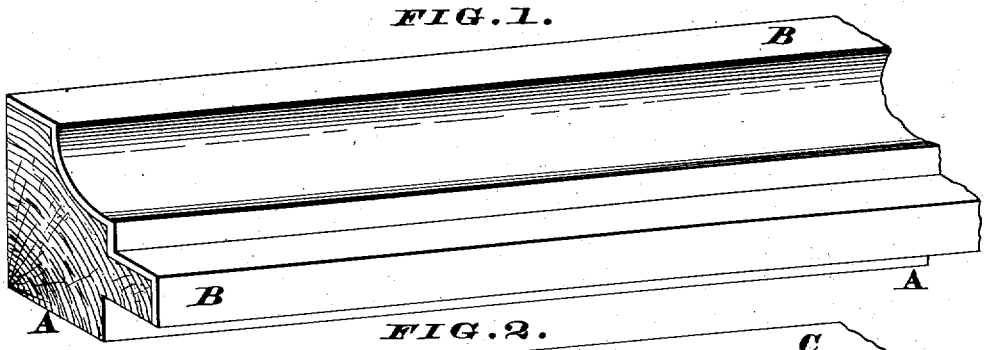
Figure 2:
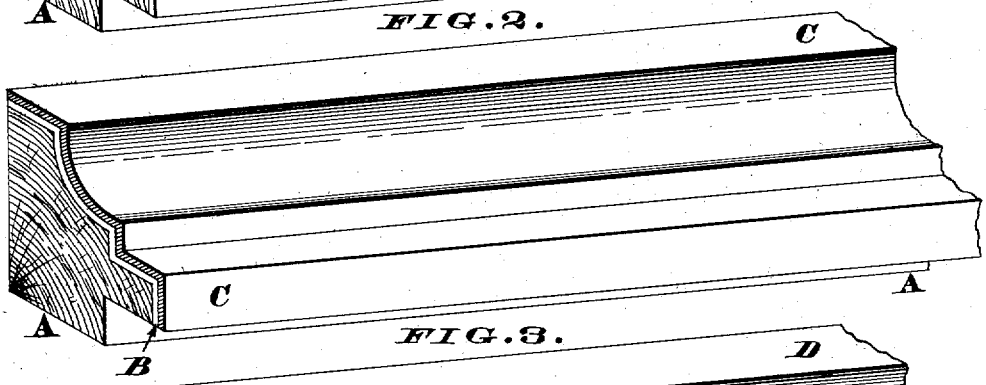
Figure 3:
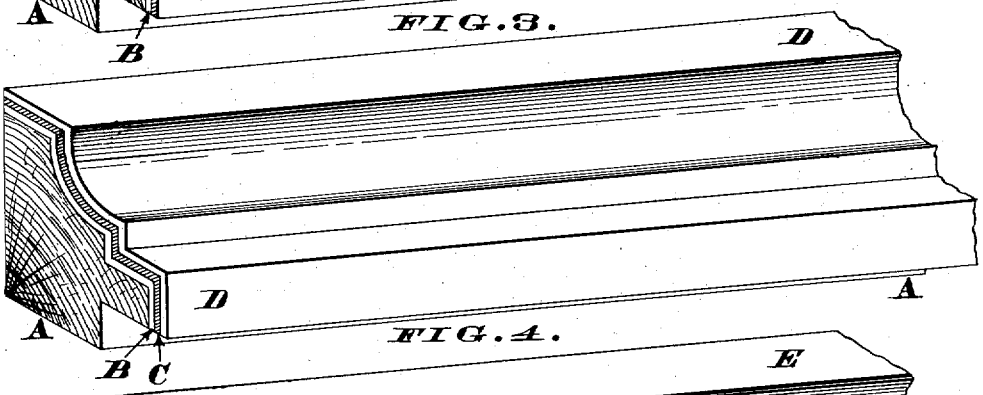
Figure 4:
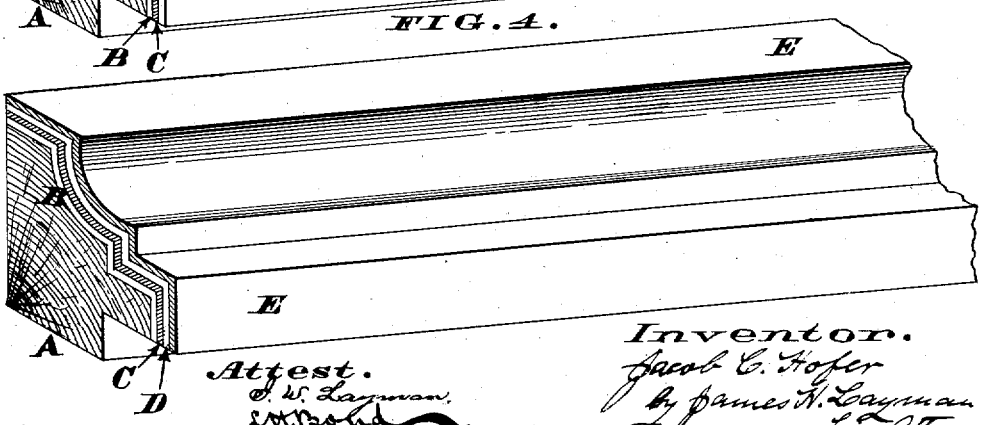

In the annexed drawings, Figures 1, 2, 3, and 4 are perspective views, showing the successive stages in my process of gilding moldings.

A represents a piece of molding or other stuff, of any suitable size and shape, and B is the customary coat or ground of whiting applied to the face of the same. This whiting-ground is covered with a coat of gold-size, as seen at C in Fig. 2, and this coat has washed over it the starch-size. (Represented at D in Fig. 3.) This last-mentioned size is prepared by boiling about two table-spoonfuls of starch in a quart of water, the size being made somewhat thinner in winter than in summer. While this starch-size D is yet damp the bronze E is applied thereto with a soft brush, and is rubbed down smoothly, but expeditiously, with cotton. The molding is now allowed to stand about half a day to dry, and the bronze E is burnished to a greater or less extent, according to the prevailing style. Finally, the bronze may be protected with a coat of transparent varnish.

From the above description it will be seen that silver-leaf is not used in my process of gilding, and, consequently, I avoid the cost of such leaf and the labor of applying the same. These advantages will be more readily appreciated when it is considered that silver-leaf costs at least five times as much as bronze, while a boy at mere nominal wages will prepare a greater amount of moldings with my process than the most experienced gilder could do with the old method of laying the silver-leaf. Furthermore, it is evident my process enables other articles besides moldings to be gilded in the same expeditious and economical manner. Finally, flour-paste, or glue, or mucilage, or other adhesive substance or substances can be substituted for the starch-size.

I claim as my invention—

1. The within-described process of applying bronze to moldings, &c., by means of a suitable adhesive medium, and then wholly or partially burnishing said bronze, substantially as herein described, and for the purpose set forth.

2. The within-described process of gilding moldings, &c., which process consists in first coating the whiting-ground with gold-size, then washing this size with a solution of starch, and, finally, applying the bronze to the latter while it is yet damp, substantially as herein described, and for the purpose set forth.

3. The within-described process of gilding moldings, &c., which process consists in first coating the whiting-ground with gold or other suitable size, then washing this size with a solution of starch or other suitable adhesive medium, and applying bronze thereon while it is yet damp, said bronze being then burnished wholly or in part, substantially as herein described, and for the purpose set forth.

4. The within-described process of gilding moldings, &c., which process consists in first coating the whiting-ground with gold or other suitable size, then washing this size with a solution of starch or other suitable adhesive medium, and applying the bronze thereon while it is yet damp, said bronze being then suitably burnished and protected with a transparent varnish, substantially as herein described, and for the purpose set forth.

5. Moldings or other articles having bronze applied thereto substantially as herein described.

6. Moldings or other articles having bronze applied thereto, and burnished wholly or in part, substantially as herein described.

In testimony of which invention I hereunto set my hand.

JACOB C. HOFER.

Witnesses:
JAMES H. LAYMAN,
A. JOSEPH NUNE.